H. HUNT.
BEST AVAILABLE COPY
Horse Rake.
No. 15.
A. I. Patented Oct. 15, 1838.
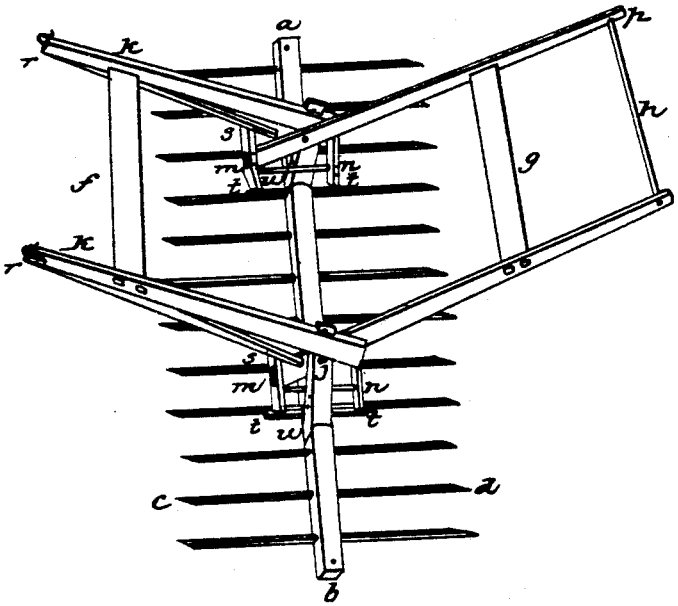
N. PETERS, Photo-Lithographer, Washington, D.C.